US008660368B2

(12) United States Patent
Datta et al.

(10) Patent No.: US 8,660,368 B2
(45) Date of Patent: Feb. 25, 2014

(54) ANOMALOUS PATTERN DISCOVERY

(75) Inventors: Ankur Datta, White Plains, NY (US);
Balamanohar Paluri, Atlanta, GA (US);
Sharathchandra U. Pankanti, Darien, CT (US); Yun Zhai, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 13/049,032

(22) Filed: Mar. 16, 2011

(65) Prior Publication Data
US 2012/0237081 A1 Sep. 20, 2012

(51) Int. Cl.
*G06K 9/68* (2006.01)

(52) U.S. Cl.
USPC ............ 382/218; 382/103; 382/159; 382/190

(58) Field of Classification Search
USPC ....... 345/690, 723; 348/77; 381/98; 382/103, 382/104, 155, 159, 160, 173
See application file for complete search history.

(56) References Cited

U.S. PATENT DOCUMENTS

| 6,459,808 | B1 * | 10/2002 | Brand | 382/155 |
| 6,801,656 | B1 * | 10/2004 | Colmenarez et al. | 382/159 |
| 7,200,266 | B2 * | 4/2007 | Ozer et al. | 382/173 |
| 7,418,128 | B2 * | 8/2008 | Simard et al. | 382/159 |
| 8,005,294 | B2 * | 8/2011 | Kundu et al. | 382/159 |
| 8,131,010 | B2 * | 3/2012 | Senior et al. | 382/103 |
| 8,165,349 | B2 * | 4/2012 | Bobbitt et al. | 382/103 |
| 8,189,905 | B2 * | 5/2012 | Eaton et al. | 382/159 |
| 8,249,301 | B2 * | 8/2012 | Brown et al. | 382/104 |
| 8,280,153 | B2 * | 10/2012 | Cobb et al. | 382/155 |
| 2004/0130567 | A1 * | 7/2004 | Ekin et al. | 345/723 |

(Continued)

FOREIGN PATENT DOCUMENTS

WO 2006/104903 A1 10/2006

OTHER PUBLICATIONS

Akakin, H. Ç, et al., "Spatiotemporal-Boosted DCT Features for Head and Face Gesture Analysis," HBU'10 Proceedings of the First International Conference on Human Behavior Understanding, Aug. 2010.*

(Continued)

*Primary Examiner* — Vikkram Bali
*Assistant Examiner* — Xuemei Chen
(74) *Attorney, Agent, or Firm* — Patrick J. Daugherty; Driggs, Hogg, Daugherty & Del Zoppo, Co., LPA

(57) ABSTRACT

A trajectory of movement of an object is tracked in a video data image field that is partitioned into a plurality of different grids. Global image features from video data relative to the trajectory are extracted and compared to a learned trajectory model to generate a global anomaly detection confidence decision value as a function of fitting to the learned trajectory model. Local image features are also extracted for each of the image field grids that include object trajectory, which are compared to learned feature models for the grids to generate local anomaly detection confidence decisions for each grid as a function of fitting to the learned feature models for the grids. The global anomaly detection confidence decision value and the local anomaly detection confidence decision values for the grids are into a fused anomaly decision with respect to the tracked object.

22 Claims, 3 Drawing Sheets

(56) References Cited

U.S. PATENT DOCUMENTS

| | | | |
|---|---|---|---|
| 2007/0263900 A1* | 11/2007 | Medasani et al. | 382/103 |
| 2009/0091588 A1* | 4/2009 | Chen et al. | 345/690 |
| 2009/0202145 A1* | 8/2009 | Yokono et al. | 382/160 |
| 2011/0058686 A1* | 3/2011 | Toraichi | 381/98 |
| 2011/0064268 A1* | 3/2011 | Cobb et al. | 382/103 |
| 2012/0075450 A1* | 3/2012 | Ding et al. | 348/77 |
| 2012/0294511 A1* | 11/2012 | Datta et al. | 382/155 |

OTHER PUBLICATIONS

Leibe, et al., Pedestrian Detection in Crowded Scenes, Proceedings of the 2005IEEE Computer Society Conference on Computer Vision and Pattern Recongnition (CVPR'05), 2005, 8 sheets.

Xiang, et al., Video Behavior Profiling of Anomaly Detection, IEEE Transactions on Pattern Analysis and Machine Intelligence, May 2008, pp. 893-908, vol. 30, No. 5.

\* cited by examiner

ANOMALOUS PATTERN DISCOVERY

BACKGROUND

The present invention relates to discovering anomalous, or unusual, patterns of motion activities in visual image data.

Determining and recognizing anomalous patterns of motion activities in visual image data is useful in determining occurrences or absences of certain activities or events. For example, image data of structures may be monitored for changes in expected or normal visual data patterns that are indicative of events and behaviors diverging from norms (for example, immediate or potential failures of structural components, or human activities outside of compliance with usual safety or other activity processes and policies). If readily distinctive to human analysis, such anomalous patterns of motion may be identified by capturing and recording visual data through still image and video systems for subsequent or contemporaneous analysis. However, human review and analysis of visual data may be difficult, time consuming or inefficient, and even non-feasible with large amounts of data. Some anomalous patterns may be subtle, or even discoverable only through computerized analysis of the visual data.

Automated video systems and methods are known wherein computers or other programmable devices directly analyze video data and attempt to recognize objects, people, events or activities of concern, etc., through identifying anomalous motion patterns through computer vision applications. However, discernment of anomalous motion patterns from normal patterns, events, etc., by automated video surveillance systems and methods systems is often not reliable in realistic, real-world environments and applications due to a variety of factors. For example, visual image data may be difficult to analyze or vary over time due to clutter, poor or variable lighting and object resolutions, distracting competing visual information, etc. False alerts or missed event recognitions must also occur at an acceptable level.

BRIEF SUMMARY

In one embodiment of the present invention, a method for anomalous pattern discovery includes tracking movement of an object in a trajectory in a video data image field that is partitioned into a plurality of different grids. Global image features from video data relative to the tracked object trajectory are extracted and compared to a learned trajectory model to generate a global anomaly detection confidence decision value as a function of fitting to the learned trajectory model. Local image features are also extracted for each of the image field grids that include object trajectory, which are compared to learned feature models for the grid to generate a local anomaly detection confidence decision for each grid as a function of fitting to the learned feature models for the grids. The global anomaly detection confidence decision value and the local anomaly detection confidence decision values for the grids are into a fused anomaly decision with respect to the tracked object.

In another embodiment, a system has a processing unit, computer readable memory and a computer readable storage medium device with program instructions to track movement of an object in a trajectory in a video data image field that is partitioned into a plurality of different grids. Global image features from video data relative to the tracked object trajectory are extracted and compared to a learned trajectory model to generate a global anomaly detection confidence decision value as a function of fitting to the learned trajectory model. Local image features are also extracted for each of the image field grids that include object trajectory, which are compared to learned feature models for the grid to generate a local anomaly detection confidence decision for each grid as a function of fitting to the learned feature models for the grids. The global anomaly detection confidence decision value and the local anomaly detection confidence decision values for the grids are into a fused anomaly decision with respect to the tracked object.

In another embodiment, an article of manufacture has a computer readable storage medium device with computer readable program code embodied therewith, the computer readable program code comprising instructions that, when executed by a computer processor, cause the computer processor to track movement of an object in a trajectory in a video data image field that is partitioned into a plurality of different grids. Global image features from video data relative to the tracked object trajectory are extracted and compared to a learned trajectory model to generate a global anomaly detection confidence decision value as a function of fitting to the learned trajectory model. Local image features are also extracted for each of the image field grids that include object trajectory, which are compared to learned feature models for the grid to generate a local anomaly detection confidence decision for each grid as a function of fitting to the learned feature models for the grids. The global anomaly detection confidence decision value and the local anomaly detection confidence decision values for the grids are into a fused anomaly decision with respect to the tracked object In another embodiment, a method for providing a service for anomalous pattern discovery includes providing an object detector and tracker that tracks movement of an object in a trajectory in a video data image field partitioned into a plurality of different grids. A global trajectory feature extractor extracts global image features from the video data image field relative to the object trajectory, and a global anomaly decider compares the extracted global features to a learned trajectory model and generates a global anomaly detection confidence decision value as a function of a fit to the learned trajectory model. A local grid feature extractor extracts features from the video data for each of the image field grids that include the object trajectory, and a local anomaly decider compares the extracted local image features for each of the grids to learned feature models and generates a local anomaly detection confidence decision value for the grid as a function of a fit to the grid learned feature model. A local-global decision fuser fuses the global anomaly detection confidence decision value with the grid local anomaly detection confidence decision values into a fused anomaly decision with respect to the tracked object.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
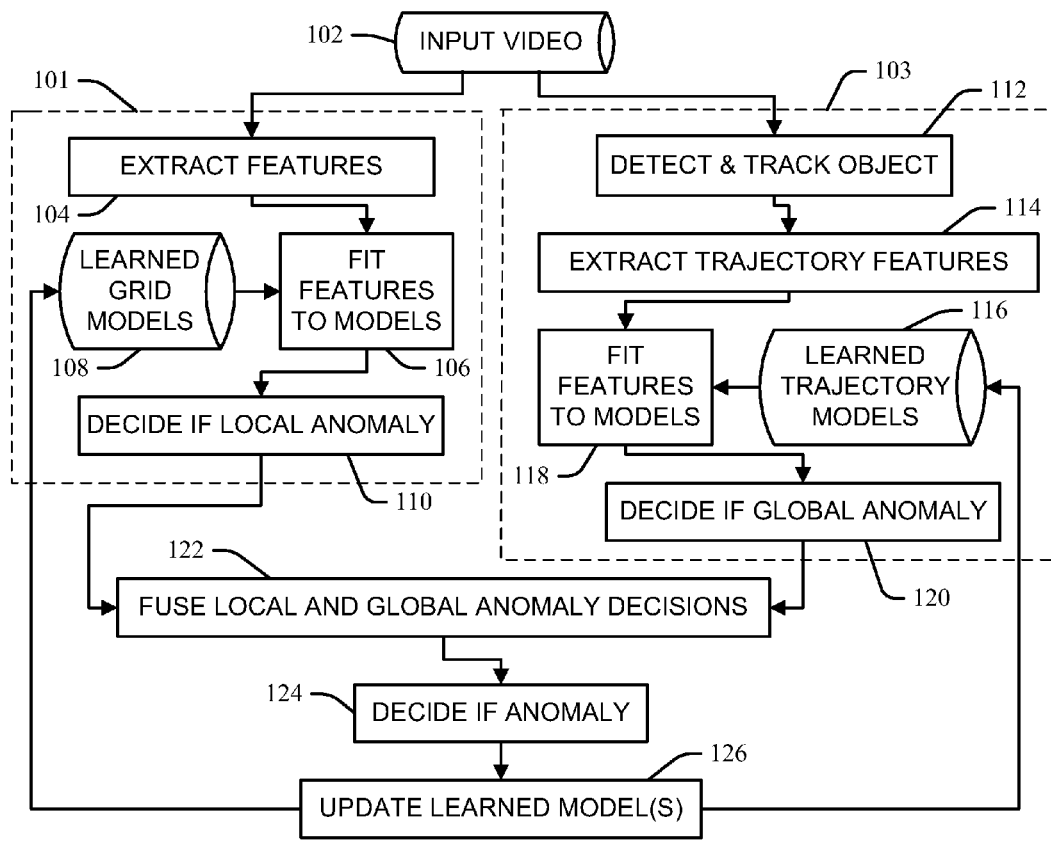
FIG. 1 is a flow chart illustration of an embodiment of a method or system for anomaly detection through combining outputs from local and global modules according to the present invention.

The drawings are not necessarily to scale. The drawings are merely schematic representations, not intended to portray specific parameters of the invention. The drawings are intended to depict only typical embodiments of the invention and, therefore, should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, an embodiment of a method, process or system for anomalous pattern discovery according to the present invention is illustrated. In a local anomaly detection module 101, an image field of a video data input 102 is partitioned into a plurality of different grids, wherein at 104 a local detector extracts image features with respect to each grid. At 106 the image features extracted by local detector for each grid are compared to a learned model 108 for each grid to generate local anomaly detection confidence decision values at 110 for each of the grids, more particularly whether the extracted features indicate that the object motion within each grid is either normal or expected, or instead anomalous (abnormal or unexpected).

In a global anomaly detection module 103, at 112 the process detects the presence of an object in an image field of the video data input 102 and tracks movement of the detected object through the image field over time through a trajectory of motion. Illustrative but not exhaustive tracked movement examples include a person object moving relative to (for example, travelling up) a staircase object and turning down a hallway object, and observing a changing separation value between two structural elements in an assembly over time that may be indicative of a structural change of the assembly or elements. At 114 a global feature extractor extracts image features from the video data relative to the trajectory of the object through the image field, for example with respect to all or a portion of the image field. At 118 a global anomaly detector compares the extracted trajectory features to a learned trajectory model 116 to generate a global anomaly detection confidence decision value 120 for the object trajectory (for example, through the entire image field or a portion thereof), the decision value at 120 providing an objective measure of a likelihood that the object trajectory is either normal or instead anomalous.

Figure 2:
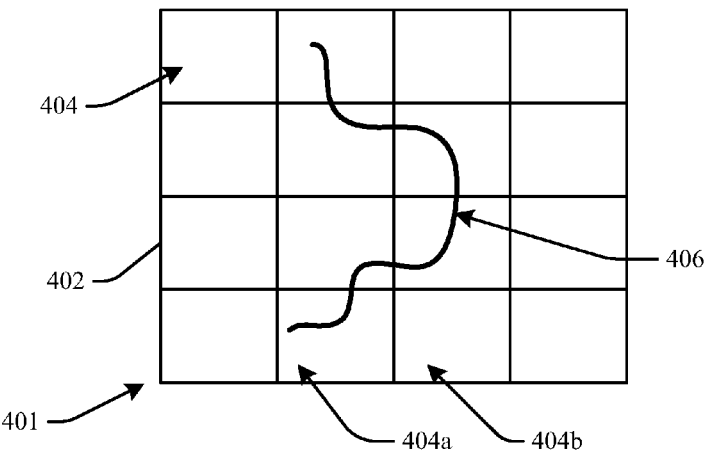
FIG. 2 is a diagrammatic illustration of tracking an object through a segmented image field according to embodiments of the present invention.

At 122 the individual grid local anomaly detection confidence decision values generated at 110 for each of the grids that the object passes through in its trajectory are fused with the global decision value generated at 120 for the trajectory to provide a fused anomaly decision 124 with respect to the object. More particularly, FIG. 2 illustrates an image field 401 of input video data 102 which comprises images of object that describe a trajectory of motion 406 over time (for example, a person travelling along a concourse within the image field 401). According to one embodiment of the present invention, the image field 401 is divided into a matrix 402 of grids 404. The object trajectory 406 travels through some of the grids 404a, but does not enter into other grids 404b, and it is the local anomaly decisions of the grids 404a that include the tracked trajectory 406 that are combined or fused with the global anomaly decision in order to decide if the object movement is normal or an anomaly.

Thus, in the present example a total number of the image field grids 404a that include the object trajectory is less than a totality of all of the partition grids 404 (inclusive of said grids 404a and the other grids 404b), leading to efficiencies over other prior art systems that may extract features for every one of the grids 404. (However, it is possible that another trajectory (not shown) may pass through all of the grids 404, wherein the local anomaly decisions of all of the partition grids 404 would be considered.) In one embodiment, the local and/or global anomaly detection confidence decision values are binary normal or anomaly values (i.e. "yes" or "no", or "one" or "zero"), though in other embodiments of the present invention the anomaly values may provide graduated values or other non-binary values.

Embodiments of the present invention may also update the local and/or global learned models 108, 116, at 126 as a function of the fused anomaly decision 124. For example, embodiments of the present invention may automatically analyze activity patterns from the video image data input 102 to build, refine or update the models for normal or anomalous behaviors (for example, relative to dominant traffic direction during rush hours). Analysis at 126 may be carried on in different scales, both in the local and global levels of the video, and in both spatial and temporal domains. In some embodiments, anomalous patterns of new video activities may be discovered by comparing their extracted features with the constructed normal pattern models. Further, normal or anomaly patterns may be iteratively adapted online using new or upcoming activities of the objects in the video data 102.

Prior art methods and systems that rely upon supervised learning require prior anomaly knowledge with detection algorithms designed specifically for known, pre-determined anomalies (for example, tripwire crossing alert systems used in high-alert area applications). However, it may not be feasible, or even possible, to build detectors comprehensive enough to detect all possible anomalies in prior art systems. Other prior art methods and systems may use semi-supervised learning, wherein anomalies need not be known or defined in advance; however, norms must still be defined or known in order to recognize anomalies by their divergence from the norm(s). Although such semi-supervised systems may perform better than supervised learning approaches in certain applications, they still require knowing normative behaviors in advance, and in some examples normal patterns may vary and even conflict with each other in different conditions. In contrast, embodiments of the present invention do not require prior knowledge on either normal or abnormal patterns, but instead they may automatically learn normal patterns by learning dominant behaviors.

Figure 3:
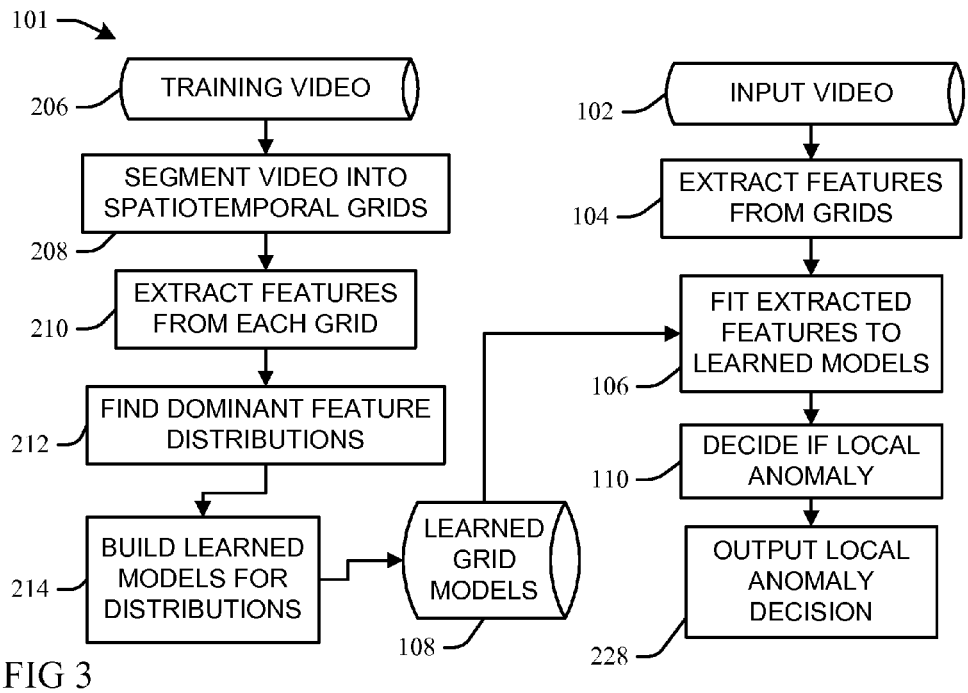
FIG. 3 is a flow chart illustration of an embodiment of a local anomaly detection method or process according to the present invention.

FIG. 3 illustrates one embodiment of the local anomaly detection module 101 of FIGS. 1 and 2. In a learning or training process an image field 401 of input training video data 206 is segmented into the matrix 402 of small grids 404 in a spatiotemporal domain at 208. At 210 texture features are extracted from each grid 404 and further refined by a dimension reduction technique. At 212 dominant distributions of the extracted features are found and used to define "normal" patterns, wherein rare patterns define "anomaly" or "abnormal" patterns. At 214 learned models are constructed by building either parametric models (for example, Gaussian) or non-parametric models (for example, kernel density estimation) for the learned feature distributions.

Thus, the local anomaly detection module 101 uses the learned models 216 in a detection process by using one or more local detectors to extract image features at 104 from the input video 102 with respect to each of the grids 404. At 106 the extracted grid local image features are fit to the learned models 216, for example to obtain similarities. Thus, anomaly detection decisions are made at 110 based on the individual grid fitting confidences, and an anomaly decision is made for each grid at 228.

Embodiments of the present invention may use a variety of methods and processes for feature detection and extraction. In one embodiment, feature vectors comprising ten (10) dimensions are utilized, eight (8) for directional components and two (2) for velocity in horizontal and vertical directions, wherein spatiotemporal feature vectors are derived therefrom (for example, by concatenating the directional vectors over a number of video image frames); wherein Matlab™ or Principal Component Analysis (PCA) is used to reduce dimensionality; and agglomerative clustering of the feature vectors is used (which in one aspect helps in providing a hierarchy). MATLAB is a trademark of The MathWorks, Inc., in the United States or other countries.

Figure 4:
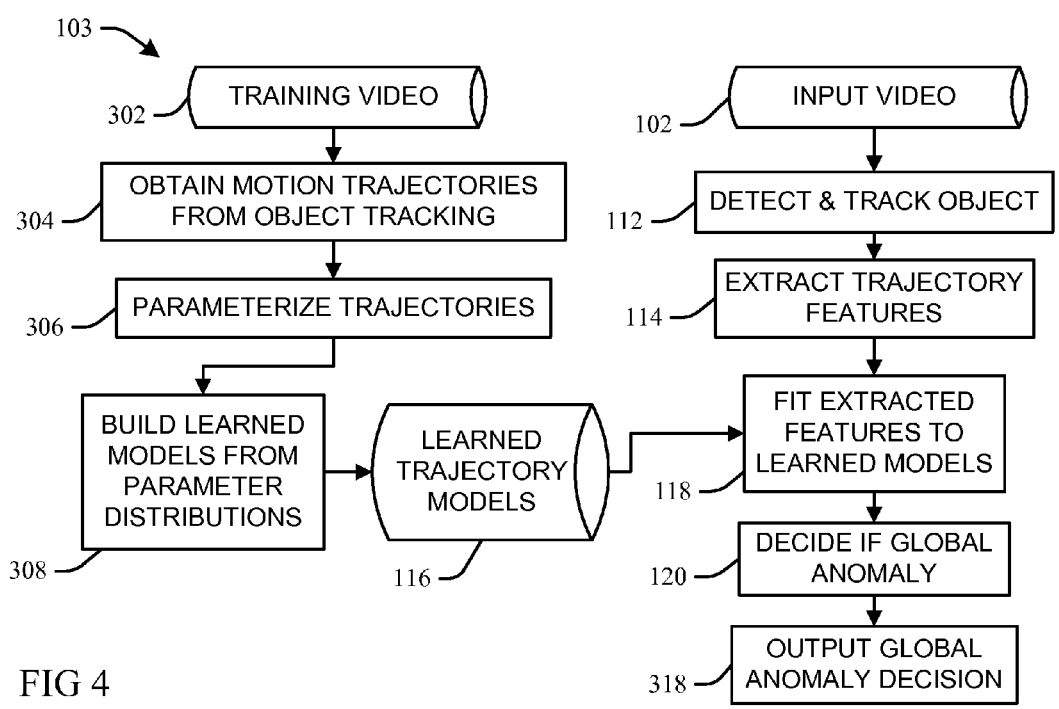
FIG. 4 is a flow chart illustration of an embodiment of a global anomaly detection method or process according to the present invention.

FIG. 4 illustrates one embodiment of the global anomaly detection module 103 of FIGS. 1 and 2. A learning (or training) process object tracking is performed at 304 on input training video data 302 to obtain motion trajectories or tracks. At 306 the obtained trajectories are parameterized, with analytic parameters obtained to represent the tracks determined at 304. In one embodiment, the determined tracks are separated or broken into uniform lengths and each length modeled with second-order polynomial coefficients, and each track is represented with a group of coefficient sets. Learned models are constructed at 308 by grouping the track coefficients using clustering techniques to produce learned models at 116.

In a detection process, the global anomaly detection module 103 of the present embodiments detects and tracks an object at 112 in the input video 102. Features of the tracked object are extracted and parameterized at 114, and the extracted track parameters are applied (fit) to the learned models 116 at 118 to find similarities to either the learned normal tracks or learned anomaly track models. As a function of the fitting process at 118 the module decides whether the object tracks are normal or anomalies at 120, and a global anomaly decision is made accordingly with respect to the object trajectory at 318.

In addition to the aforementioned embodiment, which parameterizes motion trajectories based on sub-segments, other embodiments of global models according to embodiments of the present invention utilize characteristics of the entire trajectory. One example parameterizes the trajectory using an M-order polynomial coefficient set (e.g., two dimensional cubic curves). Similar to the previous embodiment, the parameters are fed to the training process and used in the anomaly detection module. In still other embodiments of the present invention, the trajectory may be represented globally using non-parametric information, for example using spatiotemporal interest points on the trajectories.

Embodiments of the present invention fuse or otherwise combine the local and global anomaly decision outputs 228 and 318 (at 122 of FIG. 1) to obtain a final anomaly decision (at 124 of FIG. 1). In one example, the anomaly decision outputs are combined as follows:

(a.) define $\{C_L\}$ as the local anomaly decision output 228, and $\{C_G\}$ as the global anomaly decision output 318;

(b) given an input motion trajectory $\{J\}$ in the input video data 102, find all of the video grids (404, FIG. 2) that the object travels through as a set of those grids (404a, FIG. 2) $\{G_1, \ldots, G_n\}$, and find the normalized sum of the local anomaly detection confidences of all these grids: $\{Sum_L(J)\}$; and (c) apply the summed local anomaly measure for the object track to its global confidence, and obtain the overall anomaly detection confidence, according to a dynamic weighted combination $\{Final(J) = a_L Sum_L(J) + a_G C_G\}$, wherein the coefficients $\{a_L\}$ and $\{a_G\}$ are dynamically determined, their values inversely correlated to the variances of the two learned models and satisfying $\{a_L + a_G = 1\}$.

It will be appreciated by one skilled in the art that a variety of processes may be used to combine the local and global anomaly decision outputs. Illustrative but not exhaustive examples combine the values as linear weighted sums, or as log converted sums, etc., and the invention is not to be construed as limited to the examples described herein.

Prior art local feature anomaly discovery methodologies generally extract raw features directly (e.g., optical flow features, dynamic textures, etc.), which does not provide semantic meaning, and wherein features are often spatial only and do not encode temporal variations of the motion patterns. In contrast to extracting features from a single or two consecutive frames (as is typical in such prior art), embodiments of the present invention extract motion features within a temporal window, which enables capturing temporal variations in the extracted features. Moreover, in addition to low level features, embodiments of the present invention also project features onto a low dimension space such that newly obtained features possess more semantic meaning, and processing time may be reduced.

Further, prior art global feature anomaly discovery methodologies generally perform direct comparison with the explicit track representations, comparing coordinates of each point in the track; moreover, some prior art methods compare sub-sampled versions, for example, only comparing certain "key-points" in the trajectories. In contrast, embodiments of the present invention provide for parametric representations of the trajectories, group of quadratic coefficient (or other applicable) sets that may represent tracks with any length and any shape.

Figure 5:
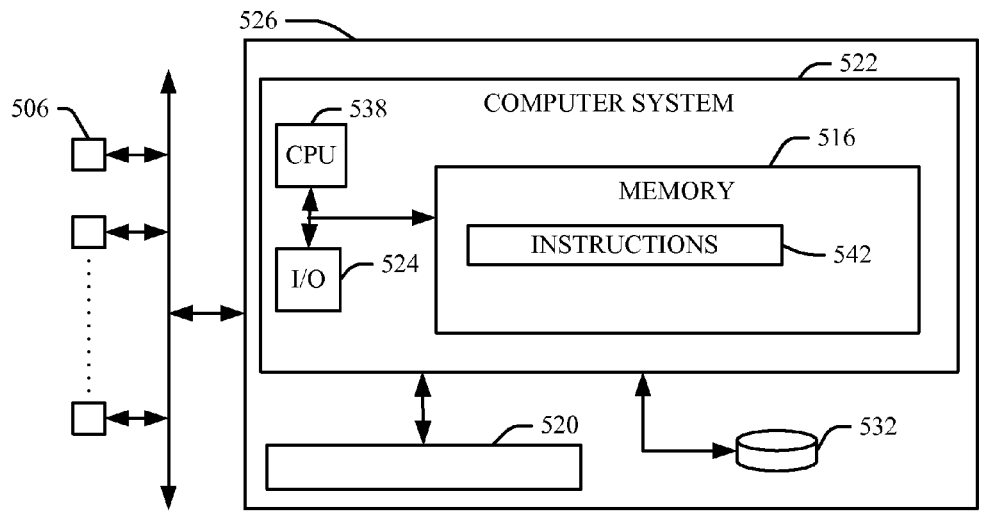
FIG. 5 is a block diagram illustration of a computerized implementation of an embodiment of the present invention.

Referring now to FIG. 5, an exemplary computerized implementation of an embodiment of the present invention includes computer or other programmable device 522 in communication with other devices 506 (for example, a video camera or video server, or a memory device comprising a database of images, etc.) that searches images and ranks the searched images with respect to query attributes as described above with respect to FIGS. 1 through 4, for example in response to instructions 542 within computer readable code residing in a computer memory 516, or in the storage system 532, another device 506 or other computer readable storage medium that is accessed through a computer network infrastructure 526. Thus, the instructions, when implemented a processing unit (CPU) 538 may provide anomaly detection through combining outputs from local and global modules as described above with respect to FIGS. 1-4.

The computer 522 comprises various components, some of which are illustrated within the computer 522. More particularly, as shown, the computer 522 includes a processing unit (CPU) 538 in communication with one or more external I/O devices/resources 524, storage systems 532 or other devices 520. Moreover, the processing unit 538 may comprise a single processing unit, or be distributed across one or more processing units in one or more locations, e.g., on a client and server. Similarly, the memory 516 and/or the storage system 532 can comprise any combination of various types of data storage and/or transmission media that reside at one or more physical locations. Further, I/O interfaces 524 can comprise any system for exchanging information with one or more of an external server and/or client (not shown). Still further, it is understood that one or more additional components (e.g., system software, math co-processing unit, etc.), not shown, can be included in the computer 522.

Figure 6:
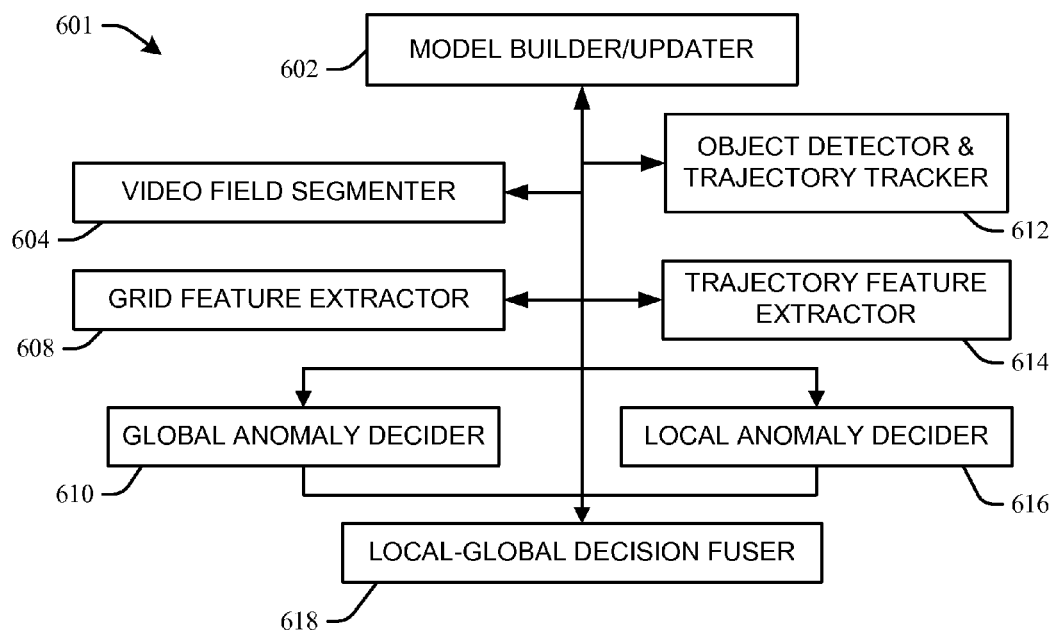
FIG. 6 is a block diagram illustration of an article according to the present invention that detects anomalies in image data through combining outputs from local and global modules.

FIG. 6 illustrates an article 601 (for example, a programmable device, system, etc.) according to the present invention that detects anomalies in image data through combining outputs from local and global modules. Thus, as understood by reference to FIGS. 1-5 and the associated description material above, an object detector and tracker 612 tracks movement of an object in a trajectory in a video data image field. A trajectory feature extractor 614 extracts global image features from the video data image field relative to the object trajectory. A global anomaly decider 610 compares global image features extracted relative to an object trajectory to a learned trajectory model and generates a global anomaly detection confidence decision value as a function of a fit of the extracted global image features to the learned trajectory model. A local grid feature extractor 608 extracts features from the video data for each of the image field grids that include the object trajectory. A local anomaly decider 616 compares extracted local image features for each of the grids that include the object trajectory to learned feature models for each of the grids that include the object trajectory and generates a local anomaly detection confidence decision value for each of said grids that include the object trajectory as a function of a fit of the extracted local image features to the learned feature models for the each grids. A local-global decision fuser 618 fuses global and local anomaly detection confidence decision values into a fused anomaly decision with respect to the tracked object. A video field segmenter 604 may also be provided that segments the image field into the grids as a matrix of grids in a spatiotemporal domain. A model builder/updater 602 may also be provided that builds the learned feature models from dominant distributions of the extracted features that define either a normal pattern or an anomaly pattern, or builds the learned trajectory model from dominant distributions of parameterized tracks of trajectories that define either a normal pattern or an anomaly pattern, and that may also update the models as a function of the fused anomaly decision.

Embodiments of the present invention may also perform process steps of the invention on a subscription, advertising, and/or fee basis. That is, a service provider could offer to detect anomalies in image data through combining outputs from local and global modules as described above with respect to FIG. 1, 3 or 4. Thus, the service provider can create, maintain, and support, etc., a computer infrastructure, such as the network computer system 522, network environment 526, and/or the article 601 (or parts thereof) that perform the process steps of the invention for one or more customers. In return, the service provider can receive payment from the customer(s) under a subscription and/or fee agreement and/or the service provider can receive payment from the sale of advertising content to one or more third parties. Services may comprise one or more of: (1) installing program code on a computing device, such as the computers/devices 522, from a computer-readable medium device 516, 520 or 506; (2) adding one or more computing devices to a computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary," one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for anomalous pattern discovery, the method comprising:

tracking movement of an input object in an image field of input video data to determine a trajectory of the input object, wherein the input video data image field is partitioned into a plurality of different grids defining a matrix and the input object trajectory passes through a plurality of input object trajectory grids;

extracting global image features relative to the trajectory and local image features from each of the input object trajectory grids of the image field of the input video data;

generating an anomaly distribution detection confidence decision value for each of the input object trajectory grids as a function of fitting the extracted local image features to a learned feature model representing normal pattern distributions or abnormal pattern distributions that are defined for the grids;

generating a trajectory similarity value for the input object trajectory as a function of similarity of a parameterized representation of the extracted global image features to a learned trajectory model representing a normal trajectory or an abnormal trajectory;

finding a normalized sum of the generated anomaly distribution detection confidence decision values for the grids that include the tracked object trajectory; and determining a fused anomaly decision value for the tracked object as a dynamic weighted combination of a product of the normalized sum and a local coefficient and a product of the trajectory similarity value and a global coefficient, wherein the local and global coefficients are dynamically determined from values that are inversely correlated to variances of the learned feature model and the learned trajectory model, and wherein the local and global coefficients sum to one.

2. The method of claim 1, further comprising:

segmenting an image field of training video data into a plurality of grids defining a matrix;

tracking a training object within the training video image field through a plurality of the grids over time to determine a training object trajectory;

extracting global training video image features relative to the training object trajectory and local training video image features from each grid of the segmented training video data image field over time;

defining dominant distributions of the extracted local training video image features over time within each of the grids as the learned feature model representing the normal pattern distributions, or rare distributions of the extracted local training video image features over time within each of the grids as the learned feature model representing the abnormal pattern distributions; and building the learned trajectory model representing the normal trajectory or the abnormal trajectory.

3. The method of claim 1, wherein at least one of the anomaly distribution detection confidence decision values and the trajectory similarity value is binary values indicating normal or anomaly.

4. The method of claim 1, wherein the plurality of different grids is a segmentation of the image field into a matrix of grids in a spatiotemporal domain.

5. The method of claim 1, wherein the step of generating the trajectory similarity value for the input object trajectory as the function of the similarity of the parameterized representation of the extracted global image features to the learned trajectory model representing the normal trajectory or the abnormal trajectory comprises:

separating the tracked object trajectory into a plurality of tracked object trajectory tracks of uniform lengths; and modeling the tracked object trajectory tracks with second-order polynomial coefficients.

6. The method of claim 2, wherein the step of building the learned trajectory model comprises:

separating the training object trajectory in the training video input into a plurality of training video tracks of uniform lengths;

modeling the training video tracks with second-order polynomial coefficients; and building the learned trajectory model as a clustered grouping of the second-order polynomial coefficients modeled from the training video tracks.

7. The method of claim 2, further comprising:

building the learned trajectory model from an ordered polynomial coefficient set representing an entirety of the training object trajectory tracked in the training video input; and wherein the extracting the global training video image features relative to the training object trajectory comprises representing an entirety of the tracked training object trajectory with another ordered polynomial coefficient set.

8. The method of claim 2, further comprising:

building the learned trajectory model from spatiotemporal interest points on the training object trajectory tracked in the training video input; and wherein the extracting the global training video image features relative to the training object trajectory comprises representing the tracked training object trajectory with spatiotemporal interest points on the tracked training object trajectory.

9. The method of claim 2, further comprising:

updating at least one of the learned feature model representing the normal pattern distributions or the abnormal pattern distributions, and the learned trajectory model representing the normal trajectory or the abnormal trajectory as a function of the fused anomaly decision value.

10. The method of claim 1, further comprising:

integrating computer readable program code into a computer system comprising a processor, a computer readable memory and a computer readable storage medium, wherein the computer readable program code is embodied on the computer readable storage medium and comprises instructions that, when executed by the processor via the computer readable memory, cause the processor to perform the steps of:

tracking the movement of the input object in the image field of input video data to determine the trajectory of the input object;

extracting the global image features relative to the trajectory and local image features from each of the input object trajectory grids of the image field of the input video data;

generating the anomaly distribution detection confidence decision values for each of the input object trajectory grids as the function of fitting the extracted local image features to the learned feature model representing the normal pattern distributions or the abnormal pattern distributions defined for the grids;

generating the trajectory similarity value for the input object trajectory as the function of similarity of the parameterized representation of the extracted global image features to the learned trajectory model representing the normal trajectory or the abnormal trajectory;

finding the normalized sum of the generated anomaly distribution detection confidence decision values for the grids that include the tracked object trajectory; and determining the fused anomaly decision value for the tracked object as the dynamic weighted combination of the product of the normalized sum and the local coefficient and the product of the trajectory similarity value and the global coefficient.

11. A system, comprising:

a processor, a computer readable memory and a computer readable storage medium;

wherein the processor, when executing program instructions stored on the computer-readable storage medium via the computer readable memory:

tracks movement of an input object in an image field of input video data to determine a trajectory of the input object, wherein the input video data image field is partitioned into a plurality of different grids defining a matrix and the input object trajectory passes through a plurality of input object trajectory grids;

extracts global image features relative to the trajectory and local image features from each of the input object trajectory grids of the image field of the input video data;

generates an anomaly distribution detection confidence decision values for each of the input object trajectory grids as a function of fitting the extracted local image features to a learned feature model representing normal pattern distributions or abnormal pattern distributions that are defined for the grids;

generates a trajectory similarity value for the input object trajectory as a function of similarity of a parameterized representation of the extracted global image features to a learned trajectory model representing a normal trajectory or an abnormal trajectory;

finds a normalized sum of the generated anomaly distribution detection confidence decision values for the grids that include the tracked object trajectory; and determines a fused anomaly decision value for the tracked object as a dynamic weighted combination of a product of the normalized sum and a local coefficient and a product of the trajectory similarity value and a global coefficient; and wherein the local and global coefficients are dynamically determined from values that are inversely correlated to variances of the learned feature model and the learned trajectory model, and wherein the local and global coefficients sum to one.

12. The system of claim 11, wherein the processor, when executing the program instructions stored on the computer-readable storage medium via the computer readable memory, further:

generates the trajectory similarity value for the input object trajectory as the function of similarity of the parameterized representation of the extracted global image features to a learned trajectory model representing the normal trajectory or the abnormal trajectory by:

separating the tracked object trajectory into a plurality of tracked object trajectory tracks of uniform lengths; and modeling the tracked object trajectory tracks with second-order polynomial coefficients.

13. The system of claim 11, wherein the processor, when executing the program instructions stored on the computer-readable storage medium via the computer readable memory, further:

segments an image field of training video data into a plurality of grids defining a matrix;

tracks a training object within the training video image field through a plurality of the grids over time to determine a training object trajectory;

extracts global training video image features relative to the training object trajectory and local training video image features from each grid of the segmented training video data image field over time;

defines dominant distributions of the extracted local training video image features over time within each of the grids as the learned feature model representing the normal pattern distributions, or rare distributions of the extracted local training video image features over time within each of the grids as the learned feature model representing the abnormal pattern distributions; and builds the learned trajectory model representing the normal trajectory or the abnormal trajectory.

14. The system of claim 13, wherein the processor, when executing the program instructions stored on the computer-readable storage medium via the computer readable memory, further builds the learned trajectory model by:

separating the training object trajectory in the training video input into a plurality of training video tracks of uniform lengths;

modeling the training video tracks with second-order polynomial coefficients; and building the learned trajectory model as a clustered grouping of the second-order polynomial coefficients modeled from the training video tracks.

15. The system of claim 13, wherein the processor, when executing the program instructions stored on the computer-readable storage medium via the computer readable memory, further:

builds the learned normal trajectory model from an ordered polynomial coefficient set representing an entirety of the training object trajectory tracked in the training video input; and wherein the extracting the global training video features relative to the training object trajectory comprises representing an entirety of the tracked training object trajectory with another ordered polynomial coefficient set.

16. The system of claim 13, wherein the processor, when executing the program instructions stored on the computer-readable storage medium via the computer readable memory, further updates at least one of the learned feature model representing the normal pattern distributions or the abnormal pattern distributions, and the learned trajectory model representing the normal trajectory or the abnormal trajectory, as a function of the fused anomaly decision value.

17. An article of manufacture for anomalous pattern discovery, the article of manufacture comprising:

a computer readable storage medium having computer readable program code embodied therewith, the computer readable program code comprising instructions that, when executed by a processor, cause the processor to:

track movement of an input object in an image field of input video data to determine a trajectory of the input object, wherein the input video data image field is partitioned into a plurality of different grids defining a matrix and the input object trajectory passes through a plurality of input object trajectory grids;

extract global image features relative to the trajectory and local image features from each of the input object trajectory grids of the image field of the input video data;

generate an anomaly distribution detection confidence decision value for each of the input object trajectory grids as a function of fitting the extracted local image features to a learned feature model representing normal pattern distributions or abnormal pattern distributions that are defined for the grids;

generate a trajectory similarity value for the input object trajectory as a function of similarity of a parameterized representation of the extracted global image features to a learned trajectory model representing a normal trajectory or an abnormal trajectory;

find a normalized sum of the generated anomaly distribution detection confidence decision values for the grids that include the tracked object trajectory; and determine a fused anomaly decision value for the tracked object as a dynamic weighted combination of a product of the normalized sum and a local coefficient and a product of the trajectory similarity value and a global coefficient; and wherein the local and global coefficients are dynamically determined from values that are inversely correlated to variances of the learned feature model and the learned trajectory model, and wherein the local and global coefficients sum to one.

18. The article of manufacture of claim 17, wherein the computer readable program code instructions, when executed by the processor, further cause the processor to:

generate the trajectory similarity value for the input object trajectory as the function of the similarity of the parameterized representation of the extracted global image features to the learned trajectory model representing the normal trajectory or the abnormal trajectory by:

separating the tracked object trajectory into a plurality of tracked object trajectory tracks of uniform lengths; and modeling the tracked object trajectory tracks with second-order polynomial coefficients.

19. The article of manufacture of claim 17, wherein the computer readable program code instructions, when executed by the processor, further cause the processor to:

segment an image field of training video data into a plurality of grids defining a matrix;

track a training object within the training video image field through a plurality of the grids over time to determine a training object trajectory;

extract global training video image features relative to the training object trajectory and local training video image features from each grid of the segmented training video data image field over time;

define dominant distributions of the extracted local training video image features over time within each of the grids as the learned feature model representing the normal pattern distributions, or rare distributions of the extracted local training video image features over time within each of the grids as the learned feature model representing the abnormal pattern distributions; and build the learned trajectory model representing the normal trajectory or the abnormal trajectory.

20. The article of manufacture of claim 19, wherein the computer readable program code instructions, when executed by the processor, further cause the processor to build the learned trajectory model by:

separating the training object trajectory in the training video input into a plurality of training video tracks of uniform lengths;

modeling the training video tracks with second-order polynomial coefficients; and building the learned trajectory model as a clustered grouping of the second-order polynomial coefficients modeled from the training video tracks.

21. The article of manufacture of claim 19, wherein the computer readable program code instructions, when executed by the processor, further cause the processor to build the learned trajectory model from an ordered polynomial coefficient set representing an entirety of the training object trajectory tracked in the training video input; and wherein the extracting the global training video image features relative to the training object trajectory comprises representing an entirety of the tracked training object trajectory with another ordered polynomial coefficient set.

22. The article of manufacture of claim 19, wherein the computer readable program code instructions, when executed by the processor, further cause the processor to update at least one of the learned feature model representing the normal pattern distributions or the abnormal pattern distributions, and the learned trajectory model representing the normal trajectory or the abnormal trajectory, as a function of the fused anomaly decision value.

\* \* \* \* \*